United States Patent [19]

Peàn et al.

[11] 4,017,196
[45] Apr. 12, 1977

[54] UNION FOR COUPLING MEMBERS

[76] Inventors: Pierre Jean-Louis Peàn; Josette Andrée Mauroux, both of 26600 Tain L'Hermitage, Beaumont-Monteux; Bernard Rey, 26800 Portes-les-Valence, Etoile-sur-Rhone, all of France

[22] Filed: Feb. 3, 1976

[21] Appl. No.: 654,968

[30] Foreign Application Priority Data

Feb. 6, 1975 France .................... 75.04402

[52] U.S. Cl. .................... 403/2; 403/337; 285/412; 64/28 R
[51] Int. Cl.[2] .................... F16B 7/00
[58] Field of Search .......... 403/335, 336, 337, 338, 403/2, 288; 285/412, 405, 363, 332, 1–4; 64/28 R, 15 R

[56] References Cited
UNITED STATES PATENTS

| 60,178 | 12/1866 | Gwynne | 403/335 |
|---|---|---|---|
| 292,095 | 1/1884 | Carlson | 64/28 R |
| 559,642 | 5/1896 | Watson | 285/332 |
| 695,022 | 3/1902 | Albertson | 285/332 X |
| 1,151,763 | 8/1915 | Dieter | 285/405 X |
| 2,232,657 | 2/1941 | Davis | 285/405 X |
| 2,929,645 | 3/1960 | Meckenstock | 403/337 |
| 3,071,942 | 1/1963 | Alcaro | 64/15 R |
| 3,453,008 | 7/1969 | LeJeune | 285/405 X |

Primary Examiner—Andrew V. Kundrat
Attorney, Agent, or Firm—Eyre, Mann, Lucas & Just

[57] ABSTRACT

A union for connecting cylindrical members has mating concentric truncated conical surfaces on annular flanges. Tubular spring pins driven into aligned assembly holes passing through the two flanges secure the union together. An alternate embodiment includes an intermediate body which may be flexible.

9 Claims, 3 Drawing Figures

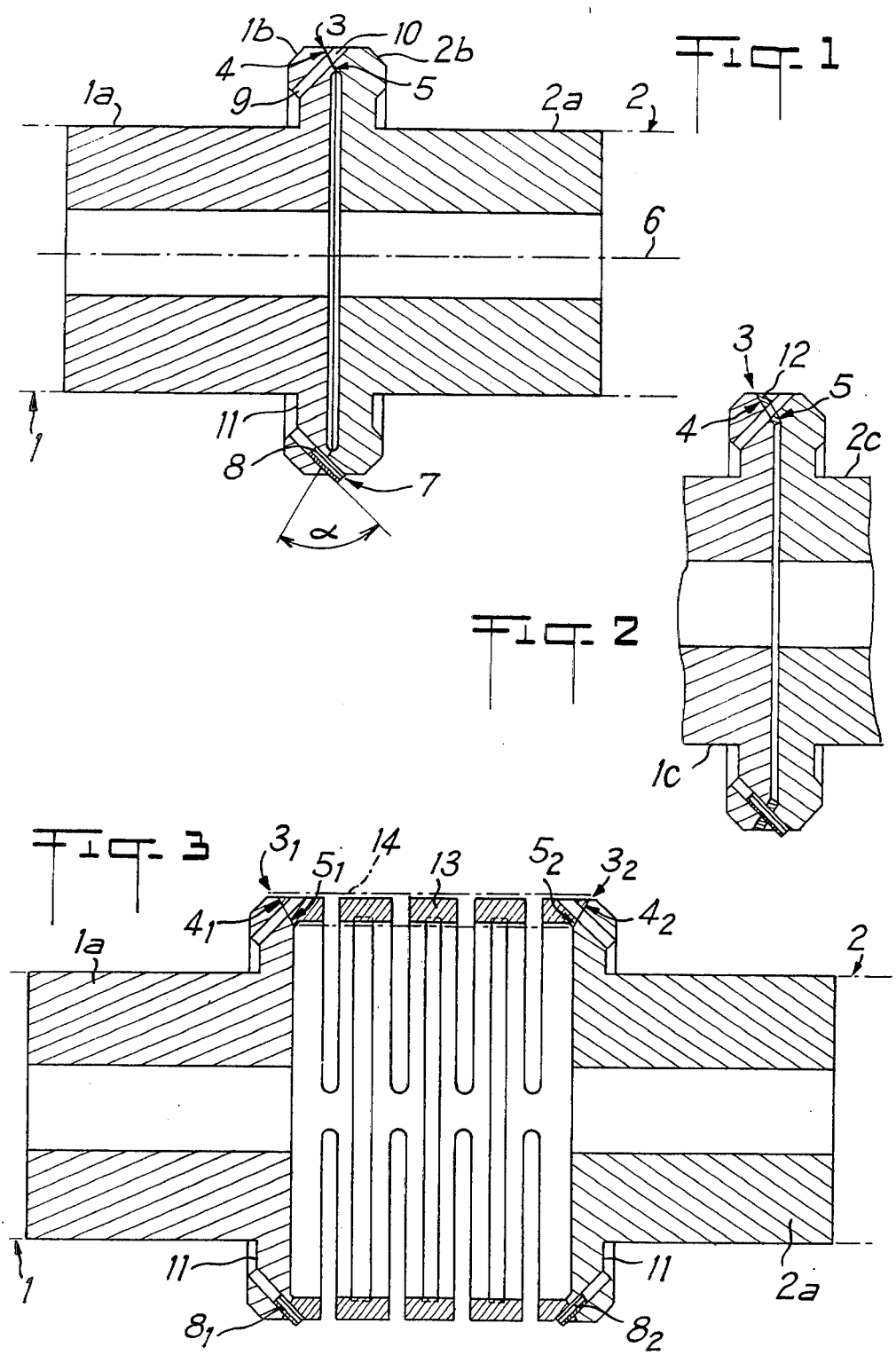

UNION FOR COUPLING MEMBERS

The present invention relates to coupling means designed to connect members together. The term "member" here being considered in its broadest sense.

To ensure the coupling between two members, connecting means are used which bring into action assembling members of the screw or bolt type intended to connect the members together directly or to connect said members and an intermediate element which may or may not be subjected to one or more elastic deformations.

Although the above-mentioned means enable a suitable coupling to be made, they present certain drawbacks, the first being that it is generally difficult, if not impossible, to dismantle the connecting members of the screw or bolt type if this proved necessary, in view of the oxidation which occurs in the majority of applications. The second resides in the difficulty in achieving a satisfactory dynamic equilibrium, for members which must be rotated. The third is due to the fact that the majority of the connecting members are not capable of ensuring a relative centering of the members to be coupled which, consequently, must be centered at the moment of assembly, in order to obtain the required precise alignment.

It is precisely an object of the present invention to remedy the drawbcks mentioned hereinabove by creating a new method of couplng which may be carried out simply, practically and inexpensively to ensure the coupling of rotating or non-rotating members, of the solid or hollow type, which may or may not be strictly aligned.

In accordance with the invention, the method of coupling members is characterised in that there is provided, on the one hand, between the members to be coupled, at least one joint plane formed by two complementary truncated centering surfaces coaxial with the axis of the members and, on the other hand, at least three angular and axial assembling and connecting members constituted by pins crossing, along the same diameter located angularly equidistant about the joint plane passing through the complementary truncated surfaces.

The invention will be more readily understood on reading the following description with reference to the accompanying drawings, in which:

FIG. 1 is an elevational cross-section showing an embodiment of the invention.

FIG. 2 is an elevational section of a variant embodiment.

FIG. 3 is a section in elevation of another embodiment of the invention.

Referring now to the drawings, FIG. 1 shows an embodiment of the method of coupling two members 1 and 2, which are, for example, rotating, but this is shown solely by way of example, in the form of shafts establishing a connection between two mechanisms (not shown). The method of coupling according to the invention consists in employing between the members 1 and 2 at least one joint plane 3 formed by two complementary truncated surfaces 4 and 5 concentric with the axis of ratation 6 common to the members 1 and 2. The truncated surfaces 4 and 5 are respectively constituted in the form of a seat and a complementary bearing surface produced by any suitable method enabling a strict concentricity with respect to the imaginary axis 6 to be obtained. The seat 4 and bearing surface 5 may be formed directly by the ends opposite the members 1 and 2 having to be coupled or by two connecting elements 1a and 2a intended to be mounted, in any suitable manner, on the ends or the terminal parts of the members 1 and 2. The seat 4 and the bearing surface 5 may be made directly at the level of the outer diameter of the members to be coupled, as illustrated in FIG. 1 on flanges 1b or 2b extending either the members 1 and 2, or the connecting elements 1a–2a.

In addition, the method of coupling according to the invention provides for the use, at the level of the joint plane 3, of assembling members 7 intended to connect the rotating members 1 and 2 either directly or via the connecting members 1a–2a, or flanges 1b–2b. The assembling members 7 are formed by at least three pins 8 crossing the joint plane 3 along the same diameter, said pins being angularly equidistant from one another. The pins 8 are forcibly engaged in holes 9 and 10, made to coincide, in the members 1 and 2, 1a and 2a or 1b and 2b. The axes of the holes 9 and 10 define an angle $\alpha$ from the corresponding local normal to the joint plane 3. The angle $\alpha$ is preferably different from a right angle. Whatever the particular embodiment of the members 1 to 1b and 2 to 2b, the holes 10 are made to open out on the outer peripheral surface of the member or element 2, 2a, 2b and to open at the level of the seat 5, whilst holes 9 also open at the level of the bearing surface 4 and open out, whatever the embodiment chosen of the element 1 to 1b, into a channel, groove, recess or hollow 11 whose particular function will be apparent hereinafter. The holes 9 and 10 are preferably cylindrical so as to receive likewise cylindrical pins 8 which are constituted, according to one of the arrangements of the invention, in the form of tubular elements that may admit a radial elastic deformation, presenting, for example, to this end an axial slot such as the pins known under the trade name of MECANINDUS. The pins 8 chosen have, of course, in the state of rest, an outer diameter slightly greater than the diameter of the holes 9 and 10 so that their positioning produces an angular connection without clearance between the members 1 and 2, by reaction to the radial deformation imposed.

In view of the above-mentioned arrangements, the pins 8 are positioned and engaged by being introduced from the orifices of holes 10 accessible at the level of the outer face of the member 2 or the elements 2a or 2b, so that the stresses resulting from the forced engagement be each time orientated towards axis 6. The pins 8 may be positioned easily and quickly since the truncated surfaces 4 and 5 ensure by their contact an exact relative centering of members 1 and 2 and since it is then sufficient, prior to the introduction of the first pin, to maintain the angular coincidence of the holes 9 and 10 by means of a removable rod or the like.

The arrangements according to the invention make it possible to effect a precise centering of the members to be coupled at low cost, and an angular connection without clearance which may, be very easily broken since, to disconnect the members or elements 1 to 1b and 2 to 2b, it is sufficient to eject the pins 8 in the direction of their introduction. This ejection is easily performed since, in all cases of execution, the elements 1 to 1b have a channel or recess 11 provided to this end, as defined hereinabove.

Apart from the possibility of a rapid angular disconnection, it should be noted that the pins 8 provide a small calibration mass which can be driven a calibrated distance into the holes 9 and 10. It thus becomes possible easily to produce a static and dynamic balance of the coupling.

Another advantage resides in the fact that the clearances caused by wear which may be produced at the level of holes 9 and 10 may easily be overcome, since it is possible to ream the diameter of the holes 9 and 10 to fit a larger size pin. Such a reaming operation may be carried out in the field.

Another advantage of the invention resides in the fact that the pins used have a shear strength known with accuracy and that they may thus assume a safety function by providing a limited maximum torque transmitted by the coupling FIG. 2 illustrates a variant embodiment intended for hollow rotary members 1c and 2c containing fluid or gas. A lining 12 is interposed between the complementary truncated surfaces 4 and 5 at the level of the joint plane 3. The assembling members 7 pass through the lining 12 which ensures gripping of said lining to effect a seal at the level of the coupling. This seal is established by the connecting members 7 but may also be completed by the axial pressure existing between the inclined surfaces 4 and 5 when the value of the angle $a$ is different from a right angle. Such a value which is different from a right angle may also be provided to increase the useful section of the assembling members 7 at the level of the joint plane 3 in order to give them a better shear strength for a given nominal diameter.

FIG. 3 illustrates a variant embodiment according to which the method of coupling according to the invention is carried out by bringing into action, between the rotating members 1 and 2 or the connecting elements 1a–1b and 2a–2b, and intermediate body 13 which is shown, by way of non-limiting example, in the form of an element that may be subjected to an axial and/or angular elastic deformation, and possibly to a bending stress. The intermediate body 13 could obviously have another form and for example be constituted by an element of the rigid type such as a Universal joint or Hooke's joint.

According to this embodiment, the method of coupling brings into action, between members 1 and 2 or elements 1a–1b, 2a–2b, two joint planes $3_1$ and $3_2$ defined by the surfaces in contact of the elements or members and of the body 13. In such an example, the joint planes $3_1$ and $3_2$ are constituted similarly to the plane 3 described hereinbefore and consequently each comprises two complementary truncated surfaces $4_1$, $5_1$ and $4_2$, $5_2$. However, in such a case, the bearing surfaces $5_1$ and $5_2$ are presented by the two members or elements 1–1a–1b= or 2–2a –2b, whilst the seats $4_1$ and $4_2$ are defined at the level of the two ends of the intermediate body 13. Such an arrangement is preferred since it enables the positioning of the pins $8_1$ and $8_2$ to be ensured by proceeding with their introduction from the peripheral surface of the body 13 and by using the members 1 and 2 or the connecting elements 1a–1b or 2a–2b as rigid dolly capable of absorbing the axial stresses necessary to provoke the radial elastic deformation and the introduction of the pins 8. Such an advantage is of particular interest when the intermediate body 13 is of the elastic type, since the assembly may then be carried out quickly and easily without any risk of a contrary rebound effect.

The arrangement according to the invention which consists in providing the bearing surfaces $5_1$ and $5_2$ on members 1 and 2 or connecting elements 1a–2a or 1b–2b, facilitates the execution and production of these elements, as well as those of the intermediate body 13 and enables a particularly precise effect of pre-centering to be obtained at the moment of assembly.

FIG. 3 shows that another disposition of the invention consists in making the holes 9 and 10 so that the pins $8_1$ and $8_2$ do not pass through the envelope which may be defined by the intermediate body 13 when it is in tubular form. Consequently, it becomes possible to use, as intermediate body, an elastically deformable tubular element, of any suitable design or production, possibly covered with a coating 14 of sealed elastic material which forms two annular seals at the level of the two truncated seats $4_1$ and $4_2$.

It therefore becomes possible to ensure the constitution of a pressure- or vacuum-tight coupling between two rotating or non-rotating members of the tubular type. A preferred application of the subject matter of the invention is therefore a sealed coupling on the toolholders of machines carrying rotating cutting tools of which the cooling fluid circulates under pressure inside the tool itself.

Another application consists in using the subject matter of the invention to ensure the coupling between pipes or tubes conveying a fluid whose relative temperature may cause expansion or shrinking of said pipes or tubes, which are absorbed or compensated for by members such as intermediate sealed bodies 13.

What is claimed is:
1. A union for coupling first and second cylindrical members comprising:
 a. a first radially directed annular flange on said first member;
 b. a second radially directed annular flange on said second member;
 c. said second flange having substantially the same diameter as said first flange;
 d. a first truncated conical mating surface on said first flange;
 e. a second truncated conical mating surface on said second flange;
 f. at least three assembling holes in each of said first and second flanges;
 g. said assembling holes passing through said first and second truncated conical mating surfaces;
 h. the axes of said assembling holes making angles of at least 5° from the normals to said mating surfaces; and
 i. means for connecting said first and second flanges together.
2. The union recited in claim 7 wherein said means for connecting comprises:
 a. an intermediate body having third and fourth annular flanges at its first and second ends, said third and fourth annular flanges having substantially the same diameter as said first and second annular flanges;
 b. said third annular flange having a truncated conical surface adapted to mating with said first truncated conical mating surface;
 c. a plurality of assembly holes in said third annular flange adapted to coaxial alignment with said assembly holes in said first annular flange;
 d. said fourth annular flange having a truncated conical surface adapted to mating with said second truncated conical mating surface;

e. a plurality of assembly holes in said fourth annular flange adapted to coaxial alignment with said assembly holes in said second annular flange; and f. a plurality of tubular spring pins having unstressed diameters exceeding the diameters of said assembly holes, said spring pins being engaged in said aligned assembly holes of said first and third and said second and fourth annular flanges.

3. The union recited in claim 1 wherein said at least three assembly holes are angularly equidistant about the axis of said first and second cylindrical members.

4. The union recited in claim 1 wherein said assembly holes extend obliquely with respect to the axis of said cylindrical members.

5. The union recited in claim 1 wherein said assembly holes enter said first annular flange, pass through said first and second truncated conical mating surfaces and exit said second annular flange.

6. The union recited in claim 1 wherein:
   a. said first truncated conical mating surface is convex
   b. said second truncated conical mating surface is concave;
   c. said assembly holes are aligned in said first and second flanges;
   e. said means for connecting is a plurality of tubular spring pins having unstressed diameters exceeding the diameter of said assembly holes; and
   f. said tubular spring pins being installed in said assembly holes and extending through said first and second truncated conical mating surfaces.

7. The union recited in claim 6 further comprising a seal between said first and second truncated conical surfaces.

8. The union recited in claim 6 wherein said tubular spring pins have a predetermined shear strength.

9. A union for coupling first and second cylindrical members comprising:

a. a first radially directed annular flange on said first member;

b. a second radially directed annular flange on said second member;

c. said second flange having substantially the same diameter as said first flange;

d. a first truncated conical mating surface on said first flange;

e. a second truncated conical mating surface on said second flange;

f. at least three assembling holes in each of said first and second flanges;

g. said assembling holes passing through said first and second truncated conical mating surfaces;

h. the axes of said assembling holes making angles of at least 5° from the normals to said mating surfaces;

i. an intermediate body having third and fourth annular flanges at its first and second ends, said third and fourth annular flanges having substantially the same diameter as said first and second annular flanges;

j. said third annular flange having a truncated conical surface adapted to mating with said first truncated conical mating surface;

k. a plurality of assembly holes in said third annular flange adapted to coaxial alignment with said assembly holes in said first annular flange;

l. said fourth annular flange having a truncated conical surface adapted to mating with said second truncated conical mating surface;

m. a plurality of assembly holes in said fourth annular flange adapted to coaxial alignment with said assembly holes in said second annular flange; and n. a plurality of tubular spring pins having unstressed diameters exceeding the diameters of said assembly holes, said spring pins being engaged in said aligned assembly holes of said first and third and said second and fourth annular flanges.

\* \* \* \* \*

UNITED STATES PATENT OFFICE
CERTIFICATE OF CORRECTION

Patent No. 4,017,196     Dated April 12, 1977

Inventor(s) Pierre Jean-Louis Pean et al.

It is certified that error appears in the above-identified patent and that said Letters Patent are hereby corrected as shown below:

Col. 4, Line 53 (Claim 2): "claim 7" should read --claim 1--

Signed and Sealed this fifth Day of July 1977

[SEAL]

Attest:

RUTH C. MASON
*Attesting Officer*

C. MARSHALL DANN
*Commissioner of Patents and Trademarks*